(12) United States Patent
Jang et al.

(10) Patent No.: US 7,536,497 B2
(45) Date of Patent: May 19, 2009

(54) DEVICE AND METHOD FOR PERFORMING MULTI-FUNCTION USING UNIQUE PORT IN WIRELESS TERMINAL

(75) Inventors: Woo-Seok Jang, Gumi-si (KR); Ji-Hwa Kim, Gyeongsangbuk-do (KR); Yeong-Moo Ryu, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 412 days.

(21) Appl. No.: 11/375,003

(22) Filed: Mar. 15, 2006

(65) Prior Publication Data

US 2006/0288150 A1    Dec. 21, 2006

(30) Foreign Application Priority Data

Jun. 16, 2005    (KR)    ............ 10-2005-0051978

(51) Int. Cl.
*G06F 13/00* (2006.01)
(52) U.S. Cl. ............ 710/316; 710/300
(58) Field of Classification Search ......... 710/300–304, 710/106, 110, 316, 317
See application file for complete search history.

(56) References Cited

U.S. PATENT DOCUMENTS

| | | | | |
|---|---|---|---|---|
| 6,516,205 B1 * | 2/2003 | Oguma | ............ | 455/557 |
| 6,820,166 B2 * | 11/2004 | Kitagawa | ............ | 710/316 |
| 6,836,814 B2 * | 12/2004 | Takaoka et al. | ............ | 710/316 |
| 7,028,126 B1 * | 4/2006 | Liang | ............ | 710/301 |
| 7,053,692 B2 * | 5/2006 | Parris et al. | ............ | 327/427 |
| 7,085,876 B2 * | 8/2006 | Lai et al. | ............ | 710/313 |
| 7,185,132 B2 * | 2/2007 | Tang | ............ | 710/305 |

FOREIGN PATENT DOCUMENTS

| | | |
|---|---|---|
| CN | 1438582 | 8/2003 |
| CN | 1567951 | 1/2005 |
| DE | 10128469 | 12/2002 |
| EP | 0 982 663 A2 | 3/2000 |
| GB | 2 352 540 A | 1/2001 |
| JP | 2001-306495 | 11/2001 |
| KR | 1020010073533 A | 8/2001 |
| KR | 1020020080186 A | 10/2002 |
| KR | 1020050037371 A | 4/2005 |

\* cited by examiner

*Primary Examiner*—Glenn A Auve
*Assistant Examiner*—Trisha Vu
(74) *Attorney, Agent, or Firm*—Roylance, Abrams, Berdo & Goodman, LLP

(57) ABSTRACT

Disclosed is a device and method for performing a multi-function using a unique port in a wireless terminal capable of performing a multimedia function using the unique port. The device includes an interface unit for outputting a power signal through a connector inserted into the unique port, and performing data transmission/reception between a specific controller and the connector. A signal generating unit outputs a high-level signal by using the power signal output from the interface unit. A switching unit switches to a specific controller to communicate data with the connector, in order to output the high-level signal. At least two controllers include at least two transmission/reception units, for transmitting/receiving data to/from the connector through the switching unit.

15 Claims, 2 Drawing Sheets

DEVICE AND METHOD FOR PERFORMING MULTI-FUNCTION USING UNIQUE PORT IN WIRELESS TERMINAL

PRIORITY

This application claims the benefit under 35 U.S.C. 119(a) of Korean Patent Application entitled "Device And Method For Performing Multi-Function Using Unique Port In Wireless Terminal" filed in the Korean Intellectual Property Office on Jun. 16, 2005 and assigned Serial No. 2005-51978, the entire disclosure of which is hereby incorporated by reference.

BACKGROUND OF THE INVENTION

1. Field of the Invention

The present invention relates to a device and method for performing a multi-function using a unique port in a wireless terminal. More particularly, the present invention relates to a device and method for performing a multi-function using a unique port in a wireless terminal capable of performing a multi function using the unique port.

2. Description of the Related Art

In a wireless terminal, including a main controller and a sub-controller, a controller (DSP) can transmit/receive data to/from a Universal Serial Bus (USB) via one USB port. For example, two controllers require two USB ports in order to perform USB communication. Also, the sub-controller transmits/receives data to/from a USB through the main controller. When the sub-controller performs USB communication through the main controller, high-speed communication is degraded. In addition, when using a USB line through the switching operation, if a USB cable is connected and used before entering a USB mode according to a program, the connection to a USB host may fail.

Accordingly, there is a need for an improved port in a wireless terminal that performs a multi function and maintains connection, without degrading communication.

SUMMARY OF THE INVENTION

An aspect of embodiments of the present invention is to address at least the above problems and/or disadvantages and to provide at least the advantages described below. Accordingly, an aspect of embodiments of the present invention is to provide a device and method for performing a multi-function using a unique port in a wireless terminal capable of performing a multi function using the unique port.

To accomplish this object, in accordance with one aspect of an exemplary embodiment of the present invention, there is provided a device for performing a multi-function through a unique port in a wireless terminal. The device comprises an interface unit for outputting a power signal through a connector inserted into the unique port, and performing data transmission/reception between a specific controller and the connector. A signal generating unit outputs a high-level signal by using the power signal output from the interface unit. A switching unit is switched to a specific controller to communicate data with the connector, in order to output a high-level signal transmitted from the signal generating unit. At least two controllers, which includes at least two transmission/reception units for transmitting/receiving data to/from the connector through the switching unit.

In accordance with another aspect of an exemplary embodiment of the present invention, there is provided a device for performing a multi-function through a unique port in a wireless terminal. The device comprises an interface unit for outputting a power signal through a connector inserted into the unique port, and performing data transmission/reception between a specific controller and the connector. A first signal generating unit outputs a high-level signal by using the power signal output from the interface unit. A switching unit is switched to a specific controller to communicate data with the connector, in order to output a high-level signal transmitted from the first signal generating unit. A main controller including a transmission/reception unit for transmitting/receiving data to/from the connector, in order to receive a high-level signal output from the first signal generating unit. At least one sub-controller includes a second signal generating unit and a transmission/reception unit, wherein the second signal generating unit converts a high-level signal output from the switching unit to a low-level signal, and the transmission/reception unit transmits/receives data to/from the connector through the switching unit.

In accordance with still another aspect of an exemplary embodiment of the present invention, there is provided a method for performing a multi-function through a unique port in a wireless terminal including at least two controllers. The method comprises generating a high-level signal by using a power signal output through a connector, when the connector is inserted into the unique port. The high-level signal is output to a specific controller connected to communicate data with the connector. Data transmission/reception is performed between the specific controller and the connector after the high-level signal is output.

In accordance with still another aspect of an exemplary embodiment of the present invention, there is provided a method for performing a multi-function through a unique port in a wireless terminal including a main controller and at least one sub-controller. The method comprises generating a high-level signal by using a power signal output through a connector, when the connector is inserted into the unique port. Data transmission/reception is performed between the main controller and the connector, after outputting the high-level signal to the main controller. The high-level signal is output to a specific controller connected in order to communicate data with the connector, converting the high-level signal into a low-level signal, and outputting the low-level signal. Data transmission/reception is performed between the specific controller and the connector after the low-level signal is output.

BRIEF DESCRIPTION OF THE DRAWINGS

The above and other objects, features and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENT

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
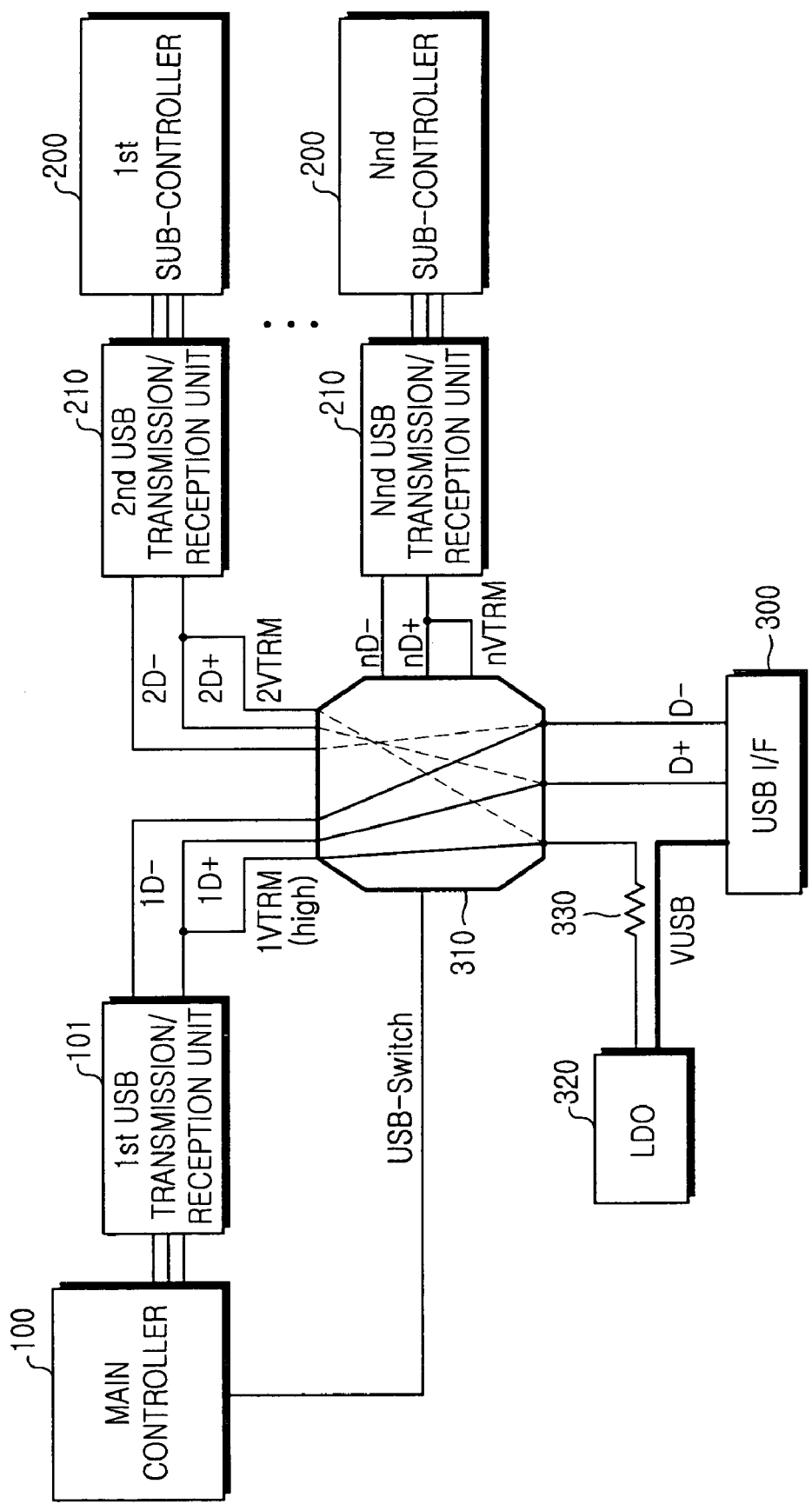
FIG. 1 is a block diagram illustrating the construction of a wireless terminal performing a multi-function through a unique port according to an exemplary embodiment of the present invention.

FIG. 1 is a block diagram illustrating the construction of a wireless terminal performing a multi-function through a unique port according to an exemplary embodiment of the present invention. An exemplary implementation of the present invention will be described with an assumption that a control section includes one main controller and at least one sub-controller. Also, in an exemplary embodiment of the present invention, the wireless terminal is assumed as being constructed to transmit/receive data through Universal Serial Bus (USB) communication.

Referring to FIG. 1, when a USB connector is inserted into a unique USB port included in the wireless terminal, a USB interface unit 300 senses a connection, and outputs a power signal from the USB connector to a signal generating unit. The USB connector connects the wireless terminal to an external device so that data can be transmitted/received between the wireless terminal and the external device.

When a controller for transmitting/receiving data to/from the external device has been determined, the USB interface unit 300 connects a transmission/reception path of the relevant controller to a transmission/reception path of the USB interface unit 300 so that data can be transmitted/received between the relevant controller and the USB connector.

The signal generating unit generates a high-level signal by using the power signal through the USB interface unit 300, and outputs the generated high-level signal to a switching unit 310. The signal generating unit includes a regulator 320 and a resistor 330. In an exemplary embodiment of the present invention, the regulator 320 comprises a low-drop-output (LDO) regulator. The LDO regulator generates a voltage of 3.3 volts by using a voltage of 5 volts input through the USB interface unit 300. The voltage of 3.3 volts creates a high-level signal through the resistor 330.

The switching unit 310 switches the external device to a relevant controller (that is, the main controller 100 or at least one sub-controller 200) to transmit/receive data to/from the external device through the USB connector that is inserted into the unique USB port, under the control of the main controller 100. The switching unit 310 outputs the high-level signal created by the signal generating unit to the switched relevant controller.

Also, the switching unit 310 is switched to allow data to be transmitted/received between the relevant controller (which has received the high-level signal) and the external device, which has been connected to the USB connector inserted into the unique USB port.

The main controller 100 controls the general operation of the wireless terminal, and the sub-controller 200. Also, the main controller 100 controls the switching unit 310, so that the external device connected to the USB connector inserted into the unique USB port is connected to a relevant sub-controller requesting data communication with the external device.

In addition, in order to communicate data with the external device, the main controller 100 controls the switching unit 310, so that the main controller 100 is connected to the external device, which is connected to the USB connector inserted into the unique USB port.

Also, the main controller 100 includes a first USB transmission/reception unit 101, and communicates data through the first USB transmission/reception unit 101 with the external device connected to the USB connector that is inserted into the unique USB port.

The wireless terminal includes at least one sub-controller 200, wherein each sub-controller controls its corresponding function. The sub-controllers 200 communicate data with the external device connected to the USB connector that is inserted into the unique USB port, under the control of the main controller 100. Also, the sub-controllers 200 include and communicate data through second to nth USB transmission/reception units 210, respectively, with the external device connected to the USB connector that is inserted into the unique USB port.

The operation of performing a multi-function through the unique port in the wireless terminal shown in FIG. 1 will now be described. When a USB connector connected to an external device is inserted into the unique USB port of the wireless terminal, the USB interface unit 300 senses a connection, and outputs a power signal through the USB connector to the signal generating unit.

The signal generating unit then generates a high-level signal through the LDO regulator and resistor.

In this case, when a function controlled by the main controller 100 is selected, the main controller 100 senses a selection, and controls the switching unit 310 to connect the signal path of the signal generating unit and the signal path of the first USB transmission/reception unit 101.

Also, the main controller 100 controls the switching unit 310 so that the switching unit 310 connects the transmission/reception path D+ and D− of the USB interface unit 300 and the transmission/reception path 1D+ and 1D− of the first USB transmission/reception unit 101.

Then, the high-level signal output from the signal generating unit is output to the main controller 100 connected through the switching unit 310. The main controller 100, which received the high-level signal, communicates with the external device connected to the USB connector inserted into the unique USB port, through the first USB transmission/reception unit 101.

When a function controlled by a first sub-controller is selected, the main controller 100 senses a selection, and controls the switching unit 310 to connect the signal path of the signal generating unit and the signal path of the second USB transmission/reception unit 210 of the first sub-controller.

Also, the main controller 100 controls the switching unit 310 so that the switching unit 310 connects the transmission/reception path D+ and D− of the USB interface unit 300 and the transmission/reception path 2D+ and 2D− of the second USB transmission/reception unit 210.

Then, the high-level signal output from the signal generating unit is output to the first sub-controller connected through the switching unit 310. The first sub-controller, which received the high-level signal, communicates with the external device connected to the USB connector inserted into the unique USB port, through the second USB transmission/reception unit 210.

According to the above-mentioned procedure, at least two controllers included in the wireless terminal can communicate data with the external device connected to the unique USB port.

Figure 2:
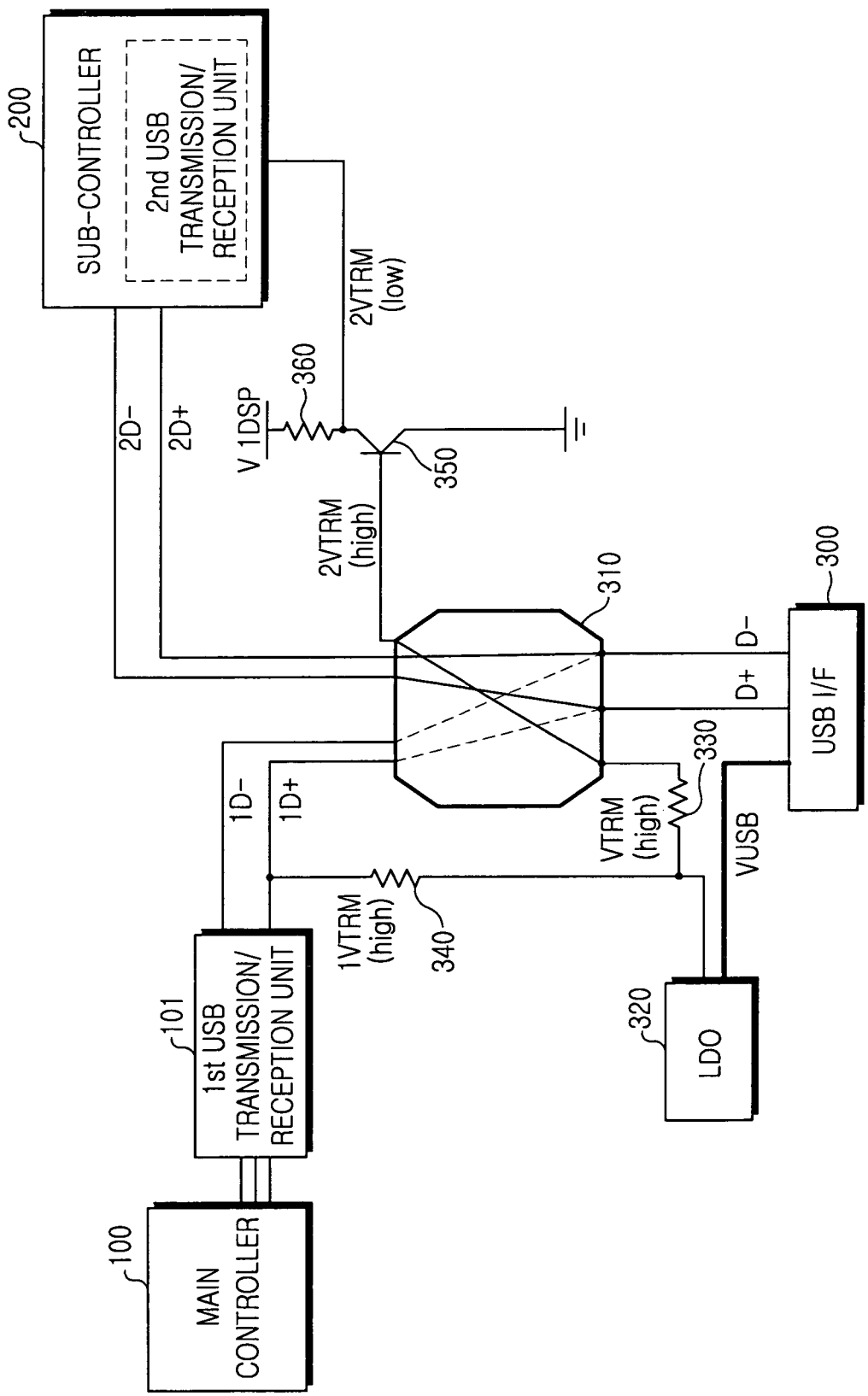
FIG. 2 is a block diagram illustrating the construction of a wireless terminal performing a multi-function through a unique port according to an exemplary embodiment of the present invention.

FIG. 2 is a block diagram illustrating the construction of a wireless terminal performing a multi-function through a unique port according to an exemplary embodiment of the present invention. The exemplary implementations of the present invention will be described with an assumption that the control section includes one main controller and one sub-controller. Also, in an exemplary embodiment of the present invention, the wireless terminal is assumed as being constructed to transmit/receive data through USB communication.

Referring to FIG. 2, when a USB connector is inserted into a unique USB port included in the wireless terminal, a USB interface unit 300 senses a connection, and outputs a power signal from the USB connector to a first signal generating unit. The USB connector connects the wireless terminal to an external device, so that data can be transmitted/received between the wireless terminal and the external device.

Also, when a controller, for transmitting/receiving data to/from the external device, has been determined, the USB interface unit 300 connects a transmission/reception path of the relevant controller to a transmission/reception path of the USB interface unit 300, so that data can be transmitted/received between the relevant controller and the external device.

The first signal generating unit generates a high-level signal by using the power signal input through the USB interface unit 300, and outputs the generated high-level signal to the main controller 100 and the sub-controller 200 through the switching unit 310. The first signal generating unit includes a regulator 320 and two resistors 330 and 340. The resistor 340 generates a high-level signal for the main controller 100, and the resistor 330 generates a high-level signal for the sub-controller 200. In an exemplary embodiment of the present invention, the regulator 320 comprises a low-drop-output (LDO) regulator. The LDO regulator generates a voltage of 3.3 volts by using a voltage of 5 volts input through the USB interface unit 300. The voltage of 3.3 volts creates a high-level signal through the resistor 340 and outputs the high-level signal to the main controller 100.

Also, the LDO regulator generates a voltage of 3.3 volts by using a voltage of 5 volts input through the USB interface unit 300. The voltage of 3.3 volts creates a high-level signal through the resistor 330 and outputs the high-level signal to a second signal generating unit of the sub-controller 200 through the switching unit 310.

The switching unit 310 switches the external device to a relevant controller (that is, the main controller 100 or the sub-controller 200) to transmit/receive data to/from the external device through the USB connector inserted into the unique USB port, under the control of the main controller 100.

According to an exemplary embodiment of the present invention, the switching unit 310 fixedly connects a signal path VTRM, through which the high-level signal created from the resistor 330 of the first signal generating unit is output, to a signal path 2VTRM of the sub-controller 200. However, if the wireless terminal includes two or more sub-controllers, the switching unit 310 may variably connect the signal path VTRM to the signal path 2VTRM of the sub-controller 200, through which the high-level signal created from the resistor 330 of the first signal generating unit is output.

The main controller 100 controls the general operation of the wireless terminal, and the sub-controller 200. Also, the main controller 100 controls the switching unit 310 so that the external device connected to the USB connector inserted into the unique USB port is connected to the sub-controller 20.

In addition, in order to communicate data with the external device, the main controller 100 controls the switching unit 310 so that the main controller 100 is connected to the external device, which is connected to the USB connector inserted into the unique USB port.

Also, the main controller 100 includes a first USB transmission/reception unit 101, and communicates data through the first USB transmission/reception unit 101 with the external device connected to the USB connector that is inserted into the unique USB port.

The sub-controller 200 controls its own relevant function. The sub-controller 200 is connected to and communicates data with the external device connected to the USB connector that is inserted into the unique USB port, under the control of the main controller 100.

Also, the sub-controller 200 includes a second signal generating unit, and converts the high-level signal output from the switching unit 310 into a low-level signal through the second signal generating unit. The second signal generating unit includes a transistor 350 and a resistor 360. When the high-level signal is output from the switching unit 310, the high-level signal is input to the transistor 350, and then a low-level signal is output through an output node of the transistor 350, which is connected to the sub-controller 200.

Also, the sub-controller 200 includes a second USB transmission/reception unit, and communicates data with the external device connected to the USB connector that is inserted into the unique USB port, through the second transmission/reception unit.

The operation of performing a multi-function through the unique port in the wireless terminal shown in FIG. 2 will now be described. When a USB connector, connected to an external device, is inserted into the unique USB port of the wireless terminal, the USB interface unit 300 outputs a power signal through the USB connector to the first signal generating unit.

The first signal generating unit, which has received the power signal from the USB interface unit 300, generates a high-level signal through the LDO regulator and the resistors 330 and 340. A high-level signal output through the resistor 340 is output to the main controller 100. Also, a high-level signal output through the resistor 330 is output to the second signal generating unit of the sub-controller 200 through the switching unit 310. The high level signal is then converted into a low-level signal through the second signal generating unit, and is transmitted to the sub-controller 200.

In this case, when a function controlled by the main controller 100, which received the high-level signal, is selected, the main controller 100 senses the selection, and controls the switching unit 310 so that the switching unit 310 connects the transmission/reception path of the USB interface unit 300 and the transmission/reception path of the first USB transmission/reception unit 101 of the main controller 100.

Then, the main controller 100 transmits/receives data through the first USB transmission/reception unit 101 to/from the external device connected to the USB connector inserted into the unique USB port.

When a function controlled by the sub-controller 200, which received the low-level signal, is selected, the main controller 100 senses the selection, and controls the switching unit 310 so that the switching unit 310 connects the transmission/reception path of the USB interface unit 300 and the transmission/reception path of the second USB transmission/reception unit of the sub-controller 200.

Then, the sub-controller 200 transmits/receives data through the second USB transmission/reception unit to/from the external device connected to the USB connector inserted into the unique USB port.

According to an exemplary embodiment of the present invention as described above, a high-level signal and a low-level signal are sequentially or randomly transmitted to the main controller 100 and the sub-controller 200, respectively, so that the main controller and the sub-controller can communicate data with an external device through a unique USB port.

Exemplary embodiments of the present invention are described with respect to the operation of performing a multi-function through a unique USB port in a wireless terminal which includes one main controller and one sub-controller. However, exemplary implementations of the present invention may be applied to a wireless terminal including one main controller and two or more sub-controllers, by controlling the switching unit so as to selectively output a low-level signal to each sub-controller according to necessity.

As described above, the present invention provides a device and method capable of performing a multi-function through a unique port in a wireless terminal, so that the unique USB port of a digital convergence device (such as a wireless terminal equipped with a camera) can be selectively used for a plurality of devices. Also, exemplary embodiments of the present invention has an advantage in that two or more controllers (DSP) employing different USB recognition schemes for various bands can share one USB port. In addition, regardless of the sequence of the software control and the cable connection, the operation matching with the USB operational timing can be ensured.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A device for performing a multi-function through a unique port in a wireless terminal, the device comprising:
    an interface unit for outputting a power signal through a connector that is inserted into the unique port, and performing at least one of data transmission and reception between a specific controller and the connector;
    a signal generating unit for outputting a high-level signal based on the power signal output;
    a first controller and a second controller comprising a respective transmission and reception unit for transmitting and receiving data to and from the connector through a switching unit; and
    the switching unit for selectively coupling one of the first and second controllers to the connector and outputting the high level signal to the selected controller, wherein the first controller controls the switching unit and the second controller.

2. The device as claimed in claim 1, wherein the unique port comprises a Universal Serial Bus (USB) unique port, the interface unit comprised a USB interface unit, and the connector comprises a USB connector.

3. The device as claimed in claim 1, wherein the connector connects the wireless terminal and an external device so that the wireless terminal communicates data with the external device.

4. The device as claimed in claim 1, wherein the signal generating unit comprises a regulator and a resistor.

5. The device as claimed in claim 1, wherein the first controller comprises a main controller and the second controller comprises a sub-controller, wherein
    the main controller controls a general operation of the wireless terminal and the sub-controller, and the switching unit so that the switching unit connects to a specific controller in order to communicate data; and
    the sub-controller controls its specific function in the wireless terminal.

6. The device as claimed in claim 5, wherein the connector connects the wireless terminal and an external device so that the wireless terminal communicates data with the external device.

7. A device for performing a multi-function through a unique port in a wireless terminal, the device comprising:
    an interface unit for outputting a power signal through a connector inserted into the unique port;
    a first signal generating unit for outputting a high-level signal by using the power signal output from the interface unit;
    a main controller including a transmission and reception unit for transmitting and receiving data to and from the connector;
    at least one sub-controller comprising a second signal generating unit and a transmission and reception unit, wherein the second signal generating unit converts the high-level signal to a low-level signal, and the transmission and reception unit transmits and receives data to and from the connector through a switching unit; and
    the switching unit for selectively coupling one of the controllers to the connector and outputting the high-level signal to the selected controller, wherein the main controller controls the sub-controller and the switching unit.

8. The device as claimed in claim 7, wherein the unique port comprises a unique Universal Serial Bus (USB) port, the interface unit comprises a USB interface unit, and the connector comprises a USB connector.

9. The device as claimed in claim 7, wherein the connector connects the wireless terminal and an external device so that the wireless terminal communicates data with the external device.

10. The device as claimed in claim 7, wherein the first signal generating unit comprises a regulator and a first and second resistor, wherein the first resistor outputs a high-level signal for the main controller, and the second resistor outputs a high-level signal for the sub-controller.

11. The device as claimed in claim 7, wherein the second signal generating unit comprises a transistor and a resistor.

12. The device as claimed in claim 7, wherein the main controller controls a general operation of the wireless terminal, at least one sub-controller, and the switching unit so that the switching unit is connected to a specific sub-controller to communicate data.

13. A method for performing a multi-function through a unique port in a wireless terminal including a main controller controlling a switching unit and at least one sub-controller, the method comprising the steps of:
    generating a high-level signal by using a power signal output through a connector, when the connector is inserted into the unique port;
    selecting one of a first controller or a second controller;
    in response to selecting the first controller, coupling the first controller to the connector, outputting the high-level signal to the first controller, and transmitting data between the first controller and the connector; and
    in response to selecting the second controller, coupling the second controller to the connector, outputting the high-level signal to the second controller, generating a low-level signal based on the high-level signal, and transmitting data between the second controller and the connector.

14. The method as claimed in claim 13, wherein the unique port comprises a unique Universal Serial Bus (USB) port, and the connector comprises a USB connector.

15. The method as claimed in claim 13, wherein the high-level signal and the low-level signal are sequentially or randomly output to the main controller and a specific sub-controller, so that at least one of data transmission and reception is performed either between the main controller and the connector or the specific sub-controller and the connector.

* * * * *